United States Patent Office 3,465,576
Patented Sept. 9, 1969

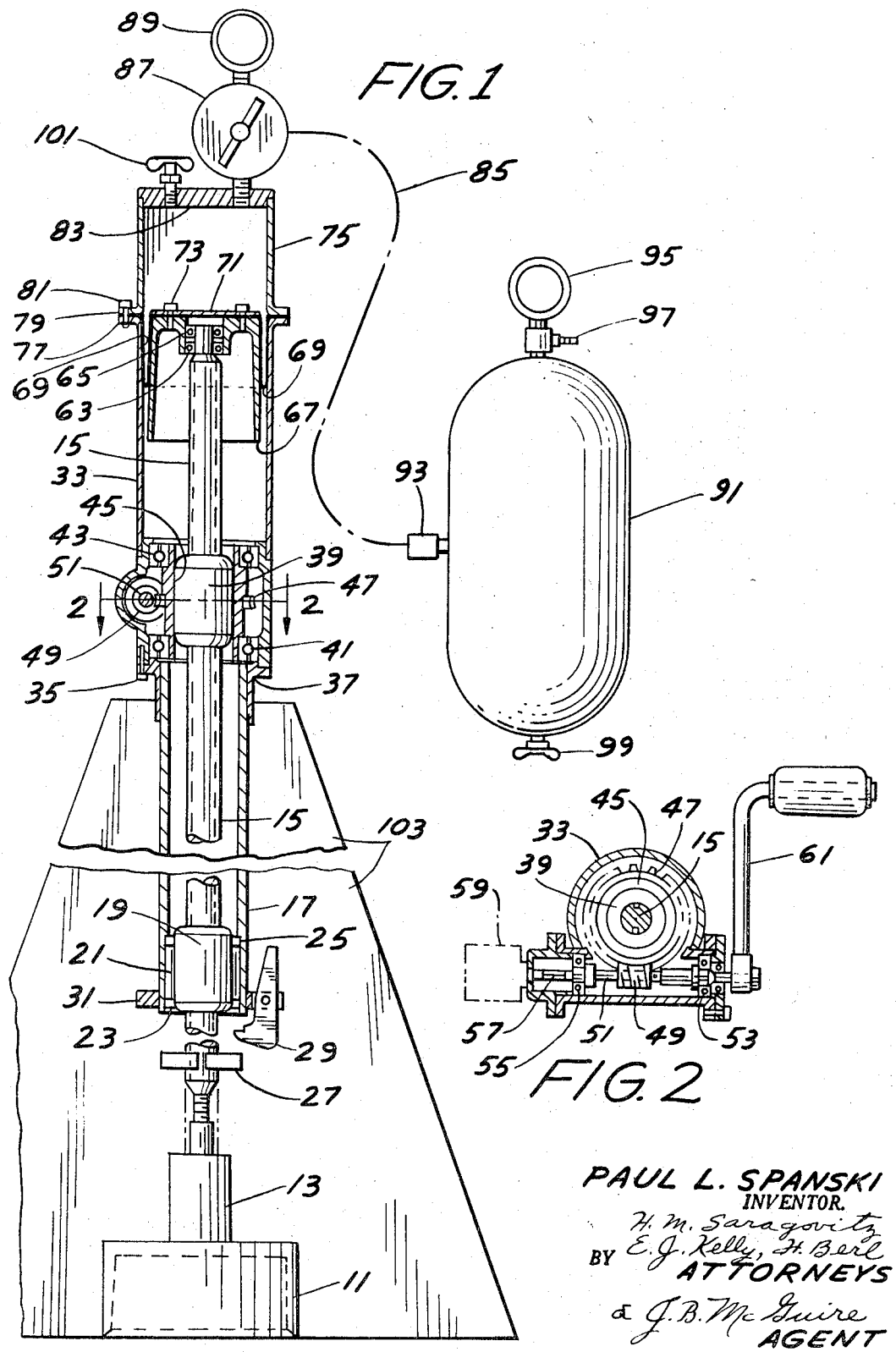

3,465,576
SOIL SHEAR DEFORMATION TESTER
Paul L. Spanski, Bloomfield Hills, Mich., assignor to the United States of America as represented by the Secretary of the Army
Filed Oct. 14, 1966, Ser. No. 588,240
Int. Cl. G01n 3/24
U.S. Cl. 73—84    3 Claims

ABSTRACT OF THE DISCLOSURE

A device for testing the shearing stress of soils in connection with extending the mobility of off-road type equipment such as tracked vehicles used by the military. The device is able to accurately measure the shearing stress by using fluid power means to exert a uniform force along the principal axis of a vertical shaft while applying a torque to a shear annulus on the shaft.

---

The invention described herein may be manufactured and used by or for the Government without the payment to me of any royalty thereon.

This invention relates to a shear deformation device and more particularly to a method and apparatus for determining soil shear strength.

One of the most important factors which must be taken into account in the design of off-the-road vehicles for specific applications is the shear strength of the soil in the particular locality in which the vehicle is to be used. Soil shear strength data is required for determining such things as track grouser and tire tread configuration and size. For example, the grouser which would be suitable for use on a tracked vehicle in the arctic would be unsuitable on a desert or beach, for the shear strength of a hard-packed surface is far greater than a sand or loam surface.

Thus, in order to design and develop a suitable friction-drive surface for a vehicle, it is first necessary to test the soil shear strength in the areas in which it is most likely that a vehicle will be used.

One method of performing a soil shear strength test is to remove a large sample of soil from the test site and take it to a laboratory for testing by complicated machinery. This method is unsatisfactory due to the probability of disturbing or loosening the sample and the large amount of personnel and equipment required.

Another method of performing a soil shear strength test is to place a device against the earth's surface, load it with a force normal to the surface, and rotate the device a predetermined amount. The values of the force applied, the distance turned, and the torque exerted are then entered into a pre-derived equation to determine the shear strength of the soil. This value is later entered into other formulae to determine tread or tire design.

Two devices for carrying out such a test are shown by Carlson, 2,603,967, and Lea, 2,709,363. Although both inventors were interested in determining soil shear strength at a predetermined depth rather than at the surface, the problems encountered in the use of their devices are solved by the present invention. In both of the prior inventions, the main problem experienced which is common to surface soil shear testing is that of loading the device with a force normal to the earth's surface. In all such testing devices, there exists an inherent tendency of the cutting bit to rise away from the soil being tested due to friction between the soil and the bit. As the bit turns in the soil and thereby loosens it, the most desirable event which could occur would be the bit being lowered slightly so as to remain in contact with normally compacted soil. To accomplish this, the bit must be acted upon by a relatively large force while it is being turned.

Attempts at providing such a force have encompassed ideas such as placing heavy weights on the device and making the structure of the supporting equipment of a large mass. These solutions to the problem have been found to be unsatisfactory, however, since they inherently require a large number of workmen and vehicles for transporting the equipment to the test site. Additionally, the handling of weights causes the expenditure of a large amount of time in obtaining a single reading.

In the present invention, the applicant has provided an apparatus which can be handled by one person, is provided with a force exertion means which can readily be adjusted to provide any desired force, and which is easily brought to and returned from the test site while providing very reliable results.

Accordingly, it is an object of this invention to provide a device for use in determining soil shear strength values which will obviate the aforementioned deficiencies in known apparatus.

It is a further object of this invention to provide a soil shear test apparatus which is rugged in construction, light in weight, reliable in use, and capable of providing test readings which are within a reasonable degree of scientific accuracy.

It is also an object of this invention to provide a soil shear testing device which can be provided with any predetermined load force by means of pneumatic pressure loading on a piston acting upon the testing bit or auger.

Other objects of the invention will become obvious to those skilled in the art upon reading the following description of a preferred embodiment of the invention which is furnished for illustration and not for limitation.

In the drawings:

FIGURE 1 is a longitudinal cross-sectional view along the axis of a preferred embodiment of the invention.

FIGURE 2 is a sectional view of the apparatus taken along line 2—2 of FIGURE 1.

More specifically, in FIGURE 1, a shear annulus 11 is placed into contact with the soil surface to be tested. Although the annulus may be of any suitable configuration, it has been found that an inverted cylinder with a shearing edge provides very satisfactory results.

Annulus 11 is fixedly attached to a torque pick-up cell 13 which measures the torque exerted on the shear annulus when it is turned by the operator. The data measured by the cell is transferred to any suitable coordinate plotter by a circuitry system (not shown) which forms no part of the present invention.

A spline shaft 15 is attached to the cell by a threaded section or other fastening means. The shaft extends into a lower housing 17 through a lower ball spline nut 19 which is supported in lower housing 17 by means of a needle bearing 21 and thrust rings 23 and 25.

A collar 27 is fixed on shaft 15 near the threaded portion. A catch 29 is pivotally mounted on a ring 31 which is fixed on lower housing 17. This is accomplished by raising the annulus manually until collar 27 is nearly into lower housing 17 and then pivoting catch 29 clockwise (FIG. 2) so as to engage the collar and hold it, and the attached structure, in the raised position.

An upper housing 33 is suitably mounted on lower housing 17 and is fixed thereto by bolts 35 extending through a circumferential flange 37. Mounted in the lower end of upper housing 33 is an upper ball spline nut 39 which is held in place by means of ball bearings 41 and 43.

The spline shaft 15 is held in rigid lateral alignment by the ball spline nuts 19 and 39 which allow free axial movement of the shaft regardless of applied torque. Mounted on upper ball splint nut 39 is a worm collar 45 which is integral with a worm gear 47. As shown in FIG. 2, worm gear 47 is engaged with a worm 49 which is suitably mounted on a shaft 51. Shaft 51 is mounted, with its axis perpendicular to the axis of spline shaft 15, in the wall of upper housing 33 by means of bearings 53 and 55 which allow revolution of the shaft. On one end of the shaft is a standard torque-limiting coupling 57 which couples the shaft to a multi-turn potentiometer 59. The readings made by the potentiometer are fed via circuitry (not shown) similar to that used for the torque pickup cell 13 to the coordinate plotter for plotting. The other end of shaft 51 is provided with a crank 61 for turning the shaft about its axis.

In practice, it has been found that with a worm 49—gear 47 ratio of 12.5 to 1.0, the cranking torque required to be exerted by the operator is very low—about 20 inch-pounds or less—even in the toughest soils. If potentiometer 59 is a ten-turn helipot, a turn of five-sixths of one revolution of the annulus can be recorded. The helipot or potentiometer can be protected from overtravel by coupling 57, a torque limiting coupling.

At the upper end of spline shaft 15, two ball bearings 63 and 65 are fixed between the shaft and movable piston 67 which moves the spline shaft in an axial direction when a force is exerted upon the piston face. A diaphragm 69, of rubber or other suitable material, is used to provide a seal between the piston and cylinder formed by the upper housing. The diaphragm is fastened to the piston by means of a plate 71 which is homologous with the piston face and fastened thereto by suitable means such as bolts 73, for example.

The seal provided by diaphragm 69 is obtained by fastening the outer edge of the diaphragm between upper housing 33 and a loading cylinder 75, i.e., where the respective flanges 77 and 79 meet, and fastening the flanges together by means such as bolts 81.

The loading cylinder 75 is capped by a loading cylinder head 83 which may be integral with the cylinder walls or suitably secured thereto.

An air hose 85 is used to charge the cylinder through a common pressure regulator 87 and pressure gauge 89. The hose in turn is connected to an air tank 91 through a coupling 93. Tank 91 can be of any suitable size such as a standard ASME pressure vessel of 0.9 cubic foot displacement with an operating pressure of 175 p.s.i. Such tanks are normally equipped with a pressure gauge 95, filling valve 97, and drain cock 99.

In order to relieve the pressure exerted on piston 67, the loading cylinder head is also provided with a relief valve 101.

The structure of the test apparatus may be supported with the axis of spline shaft 15 in a vertical position by means of tripod legs or other support structure as shown broadly at 103.

OPERATION

The test device is operated as follows: The apparatus is placed on the ground supported by its tripod 103. The starting position of the piston-annulus assembly is the fully retracted position, i.e., the piston 67 is at the top of the cylinder, and catch 29 is in engagement with collar 27. The supporting legs are then adjusted so that the shear annulus 11 is parallel to the ground and about one inch from it. When the proper circuitry and recording devices are attached to torque pick-up cell 13 and the multi-turn potentiometer, the relief valve 101 is opened, the catch 29 is released, and the shear annulus 11 is allowed to drop to the surface of the ground. Valve 101 is then closed and pressure regulator valve 87 slowly opened to pressurize the loading cylinder 75. The pressure on the cylinder is displayed by the pressure regulator gauge and the valve 87 may be adjusted to produce any desired normal load within the range allowed by air tank 91. In order to keep the apparatus from rising due to the force exerted pneumatically, the operator may stand upon the tripod legs after releasing the catch 29.

When the pressure adjustment is completed, the shear annulus is rotated by means of the crank 61. As the ground becomes separated upon rotation of the shear annulus, some sinkage of the annulus takes place causing the loading piston to drop in the loading cylinder. The decrease in pressure above the piston is automatically compensated for by the pressure regulator. A low frictional property of the spline shaft freely allows the sinkage to occur, an essential function to the production of useful data.

The desired torque-deformation data is recorded electrically on a coordinate plotter. At the completion of the reading, the pressure regulator is turned off and the cylinder relief valve is opened. The shear annulus is then retracted to its rest position and the catch reengaged. The device is now ready to move to a new location to make another reading.

It is thus evident that applicant has provided a new and novel soil shear deformation tester which provides an optimum of reliability with ease of use. As is further evident, the aforesaid reliability and ease are simply and readily achieved by means of a new and novel loading system for exerting a force on a shear annulus. The device is obviously susceptible to various changes within the spirit of the invention including of course, those of dimensioning and mechanical equivalents or expedients. Accordingly the preceding disclosure should be considered illustrative and not as limiting the scope of the following claims.

I claim:
1. In a device for use in determining soil shear strength, a pressurizeable cylinder, a piston mounted in said cylinder, a diaphragm mounted in the walls of said cylinder and fixed to the face of said piston whereby a seal is created between said cylinder and said piston, one end of a shaft connected to said piston, means mounted in said cylinder below said piston for maintaining said shaft so as to allow free axial and rotative movement of said shaft, a torque producing means mounted on said cylinder and cooperating with said shaft, a shear annulus mounted on the other end of said shaft, cooperative releasable means for retaining said piston in a raised position relative to said cylinder mounted on said shaft and said cylinder, and measuring and transmitting means cooperating with said torque producing means and said shear annulus for transmitting values of torque and shear deformation respectively.

2. The device of claim 1, wherein said measuring and transmitting means compress an electro-mechanical pick-up and transmitting cell fixedly attached to said annulus.

3. The device of claim 1, wherein said pressurizeable cylinder is charged by pneumatic pressure delivered through a common pressure regulator and pressure gauge.

References Cited

UNITED STATES PATENTS

| 2,774,240 | 12/1956 | Fehlmann | 73—84 |
| 2,907,204 | 10/1959 | Gibbs | 73—101 |
| 3,116,633 | 1/1964 | Cohron | 73—101 |
| 3,331,240 | 7/1967 | Nilsson et al. | 73—84 |

FOREIGN PATENTS 771,540   4/1957   Great Britain.

RICHARD C. QUEISSER, Primary Examiner

C. E. SNELL III, Assistant Examiner

U.S. Cl. X.R.

73—101